E. S. T. KENNEDY.

3 Sheets—Sheet 1.

BOILER DEFLECTOR.

No. 11,374.

Reissued Oct. 10, 1893.

Witnesses

Geo. Crance

W. Harry Muzzy

Inventor

Edward S. T. Kennedy

By E. B. Clark

Attorney

E. S. T. KENNEDY.

3 Sheets—Sheet 2

BOILER DEFLECTOR.

No. 11,374.

Reissued Oct. 10, 1893.

Witnesses

C. Severance

W. Harvey Muzzy.

Inventor

Edward S. T. Kennedy

By E. B. Clark

Attorney

3 Sheets—Sheet 3.

E. S. T. KENNEDY.

BOILER DEFLECTOR.

No. 11,374. Reissued Oct. 10, 1893.

Witnesses
C. Severance
W. Harvey Muzzy

Inventor
Edward S. T. Kennedy
By E. B. Clark
Attorney

UNITED STATES PATENT OFFICE.

EDWARD S. T. KENNEDY, OF NEW YORK, N. Y.

BOILER DEFLECTOR.

SPECIFICATION forming part of Reissued Letters Patent No. 11,374, dated October 10, 1893.

Original No. 349,720, dated September 28, 1886. Application for reissue filed July 22, 1893. Serial No. 481,163.

*To all whom it may concern:*

Be it known that I, EDWARD S. T. KENNEDY, a citizen of the United States of America, and a resident of the city, county, and State of New York, have invented a new and useful Improvement in Boiler Deflectors, of which the following is a specification.

The object of this invention is to provide an improvement especially applicable to vertical cylindrical boilers having radiating tubes—boilers of the so-called "porcupine" type—the improvement being designed to effect very considerable economies of fuel and steam; to assure the quick "getting up" of steam; to prevent undue heating of the boiler jacket; to insure a better circulation of water in this type of boiler; to prevent priming, and also to prevent the burning of the outer ends of the tubes, and consequently to increase the durability of the boiler and reduce the frequency and cost of repairs.

The invention consists, in combination with the boiler and its jacket, of horizontal flame-deflectors of segmental form placed or fixed within the boiler combustion-chamber in position for protecting or shielding, as far as may be desirable, the exposed ends of the tubes, and at the same time deflecting the heated products of combustion chiefly toward the boiler-cylinder, all of which will be hereinafter fully set forth.

Reference is to be had to the accompanying drawings, forming part of this specification, in which similar letters of reference indicate corresponding parts in all the figures.

Figure 1:
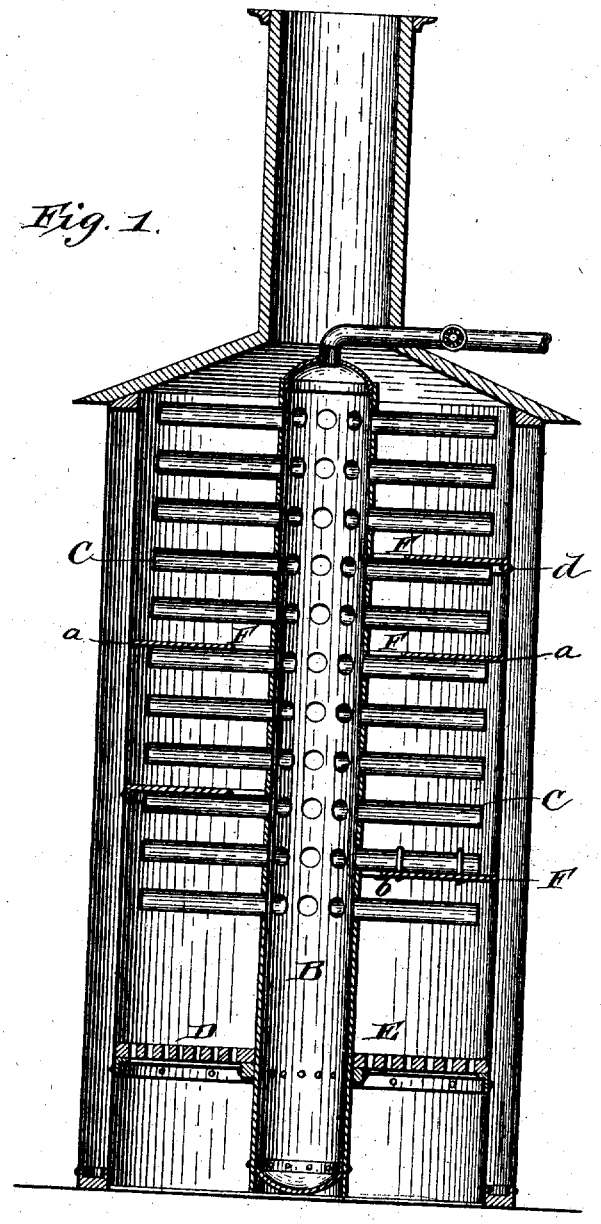
Figure 2:
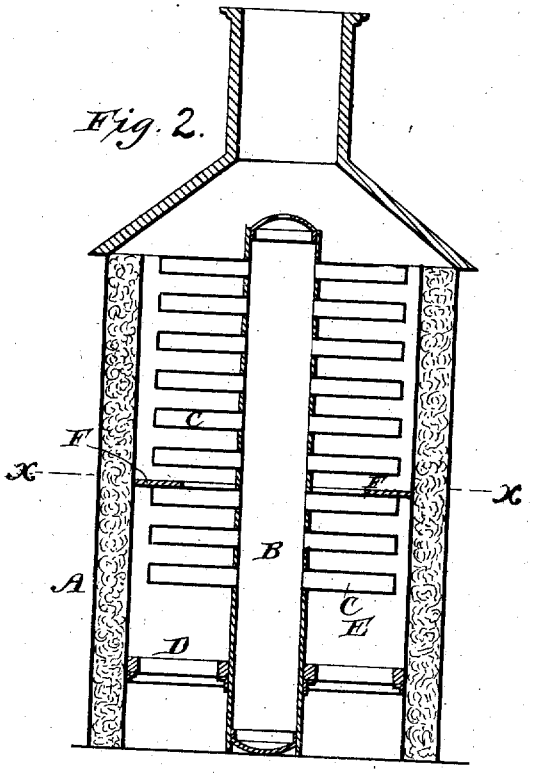
Figure 3:
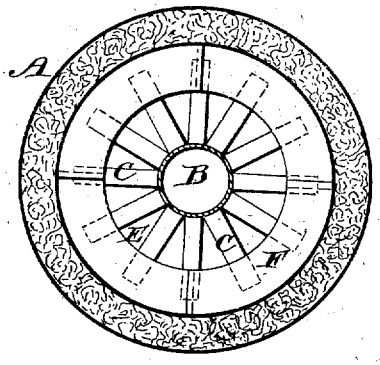
Figure 4:
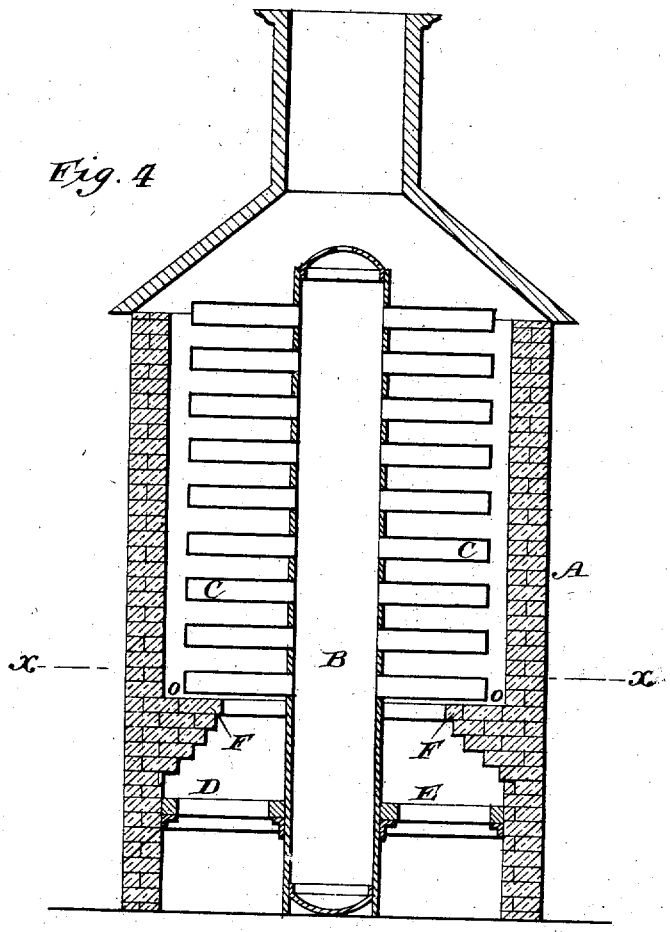
Figure 5:
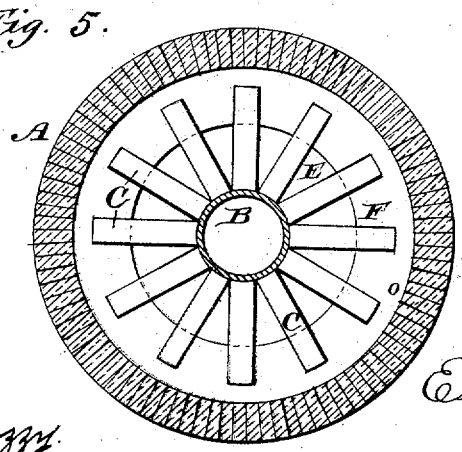

Figure 1 is a sectional elevation of a porcupine boiler, showing my improved deflector applied in several ways. Fig. 2 is a sectional elevation showing two or more deflectors forming a ring resting on the boiler-tubes. Fig. 3 is a plan of the same. Fig. 4 is a sectional elevation showing a brick deflector built into the brick boiler-jacket, and extending toward the boiler-cylinder. Fig. 5 is a plan of the same.

Though certain improvements in boilers of the porcupine type recently patented and applied by me very materially increased the durability, efficiency, and economies of the boiler, there still seemed to be further improvements desirable in order to make this boiler the most economical and perfect of steam generators. For instance, in the construction of the boiler the radial tubes would have to be set farther apart on either side of the vertical rivet seams of the boiler-cylinder than at any other portion of the circle, and hence when the boiler was set in place and fired the tendency of the products of combustion would be up through the wider opening thus made, rather than upward through the narrower spaces between the other tubes, so that the heat would not be evenly distributed about the boiler. Again, the necessary free space between the outer ends of the tubes and the boiler-inclosing shell always affords the most direct way for the escape of the products of combustion to the smoke-stack, and in their passage upward they sometimes, if their temperature be very high, injuriously affect the tube ends and also the boiler shell, sometimes distorting and burning both of them and imparting to the latter much heat, which is radiated from it into the open air and lost to all practical purposes. Again, it has in some instances been found in my practice, when the lower groups of tubes were of the usual length, that the intense heat, acting on their outer ends, drives or repels the contained water therefrom, sometimes intermittently or in pulsations, and at times for longer periods, thereby seriously impairing the water circulation, and when the tube ends have become unduly heated, because of the absence of water in them, if the furnace heat is reduced by the feeding of fresh coal or other cause, they become cooler, sufficiently so, though still perhaps red-hot, to permit the water to enter them again. Then the entering water is at once almost explosively converted into steam, with the effect of not only causing "priming" but of endangering the integrity of the tubes. All of these objections to the porcupine boiler are obviated by my invention.

In the drawings, A represents the boiler-jacket, which may consist of two concentric cylinders, with some non-conducting substance between them, as shown in Figs. 1, 2 and 3, or may be of brick, as shown in Figs.

4 and 5, or may be of a single thickness of plate-iron.

B is the boiler-cylinder, fixed centrally within the jacket, and C C represent the radial tubes thereof.

The grate-bars are shown at D, and the combustion-chamber E occupies all the space above the said bars inside the boiler-jacket.

All the details of boiler construction are not herein shown, as they will in no way be affected by my improvement.

My improved deflectors F are segmental or annular in form, to better adapt them to their functions. In Fig. 1 several of these deflectors are shown. Two are shown at *a*, resting on some of the boiler-tubes, with their convex edges in contact with the boiler-jacket and their concave edges toward the boiler cylinder, preventing the passage of the products of combustion up about the tube ends at those points and deflecting the flame toward the boiler-cylinder, that it may impart its heat to the same. In Fig. 1, also, one of these deflectors F is shown suspended at, *b*, from one or more of the boiler-tubes, and one of the deflectors is riveted to the boiler-jacket at *d*, from which it extends inward toward the boiler cylinder.

In Figs. 2 and 3, two or more deflectors F, are shown laid on the boiler tubes, and lapping or abutting each other, so as to form an annular deflector or ring, whose periphery is in contact with the boiler shell, an annular space being left between the inner circle of the deflector and the boiler-cylinder for the passage of the products of combustion.

In Figs. 4 and 5 brick deflectors are shown built into and extending from the brick boiler-jacket at *o*, for the purpose of deflecting the flame toward the boiler-cylinder. The deflector at *o*, being constructed of refractory nonconducting material, having an inner corbelled or uneven surface as shown, and built into the brick boiler jacket, below the lower water tubes and extending inwardly toward the boiler cylinder,—forms a deflecting furnace which serves the useful purpose of presenting a largely increased heating surface for the ignition and consumption of inflammable gases; also to check the flame and heated gases and at the start deflect them inwardly toward and in contact with the central boiler-cylinder; also to absorb and retain a large percentage of heat which would otherwise pass off and be lost. I thus secure a number of advantageous results which add materially to the efficiency and durability of the boiler.

In all instances the deflectors are horizontal and segmental or annular—annular when two or more of them are placed together, as in Figs. 2 and 3, form a ring; hence in such case an annular deflector or several segmental deflectors are essentially the same. The positions in which the deflectors shall be placed are determined by various conditions. If the grate-surface extends but partially around the boiler-cylinder, a deflector should be placed above the fire to direct the flame to the opposite side of the boiler. The upward draft is in some instances stronger at one point than at another. A deflector properly placed will regulate this.

The deflectors may be placed to direct the products of combustion more to any given portion of the boiler than to another portion, as may be desired. Most of these deflectors are adjustable, it will be seen, and can be easily and readily put in place and removed.

I am aware that it is a common practice to arrange deflectors under boilers of various types, but am not aware that any deflectors have been used with a boiler of this type, or that segmental or annular deflectors have ever been used in combination with an upright boiler.

I am also aware of the patent of Samuel Harris, dated May 14, 1872, for an "improvement in steam boilers" and make no claim to the construction therein shown and described. My invention is distinguished from anything shown and described in said patent of Harris by the provision of a segmental or annular brick deflector built into and extending from the brick boiler jacket and having the general form, arrangement, and functions above set forth; also by the provision of said brick deflector shown at *o*, in connection with other segmental or annular deflectors at different points above the furnace and extending inwardly from the boiler jacket and over the outer ends of the radiating tubes.

Having thus described my invention, what I claim, and desire to secure by Letters Patent, is—

1. The combination with a boiler having a vertical cylinder with radiating tubes, of a segmental or annular deflecting furnace built into the boiler jacket and extending inwardly over the fire place and under the lower radiating tubes whereby the outer ends of the lower tubes may be protected and the heated gases caused to start up centrally and in contact with the vertical cylinder, substantially as described.

2. The combination with a boiler having a vertical cylinder with radiating tubes of a segmental or annular deflecting furnace formed of material adapted to withstand and retain heat and extending inwardly over the fire place and under the lower radiating tubes, and having an irregular or uneven inner surface, whereby the outer ends of the lower tubes may be protected and the heated gases retarded or checked and afterward caused to start up centrally and in contact with the vertical cylinder, substantially as described.

3. The combination with a boiler having a vertical cylinder with radiating tubes, of a segmental or annular deflecting furnace formed of material adapted to withstand and retain heat and extending inwardly over the fire place and under the lower radiating tubes, and segmental or annular deflectors at different points above the furnace, extending inwardly from the boiler jacket and over the outer ends of the radiating tubes, whereby the heated gases may be caused to start up centrally in contact with the vertical cylinder and afterward in their upward course be deflected or thrown inwardly off the outer ends of the tubes, substantially as described.

In testimony whereof I affix my signature in presence of two witnesses.

EDWARD S. T. KENNEDY.

Witnesses:

WILLIAM T. KENNEDY,

JAMES B. REEVE.